US006671930B2

(12) United States Patent
Lanz

(10) Patent No.: US 6,671,930 B2
(45) Date of Patent: Jan. 6, 2004

(54) ADJUSTABLE TOOL MOUNT APPARATUS AND SPECIALIZED TOOL HANDLE THEREOF

(76) Inventor: Donald D. Lanz, 15657 Neibur Rd., Oregon City, OR (US) 97045

( * ) Notice: Subject to any disclaimer, the term of this patent is extended or adjusted under 35 U.S.C. 154(b) by 0 days.

(21) Appl. No.: 09/764,249

(22) Filed: Jan. 17, 2001

(65) Prior Publication Data

US 2001/0047570 A1 Dec. 6, 2001

Related U.S. Application Data

(60) Provisional application No. 60/179,571, filed on Feb. 1, 2000.

(51) Int. Cl.[7] .......................... A47J 45/00; B25G 3/18; B25G 3/00

(52) U.S. Cl. .......................... 16/429; 16/405; 403/321; 403/359.5

(58) Field of Search .......................... 16/429, 436, 900, 16/405; 403/321, 322.1, 322.3, 322.4, 325, 359.1, 359.6, 345, 359.5

(56) References Cited

U.S. PATENT DOCUMENTS 3,004,362 A * 10/1961 Day ................................ 43/6
3,380,097 A * 4/1968 Pharris ........................ 15/145
3,969,033 A * 7/1976 Recker .................... 403/322.2
4,289,414 A * 9/1981 Recker ........................ 403/12
4,407,039 A * 10/1983 Moss ........................ 15/144.2
4,607,974 A * 8/1986 Brothers et al. .............. 403/24
4,663,796 A * 5/1987 Helling et al. ............. 15/144.2
4,683,610 A * 8/1987 Richards et al. .............. 16/115
4,700,420 A * 10/1987 Belanger ....................... 7/114
5,050,261 A * 9/1991 Hofacker ................... 15/144.1
5,099,539 A * 3/1992 Forester .................... 15/143 B
5,112,156 A * 5/1992 Boyer ........................ 403/287
5,172,447 A * 12/1992 Tomm ....................... 15/159.1
5,598,598 A * 2/1997 Sorenson ................... 15/144.4
5,779,385 A * 7/1998 Fechter ....................... 403/328
6,199,245 B1 * 3/2001 Blessing ...................... 16/430
6,349,451 B1 * 2/2002 Newman et al. .............. 16/427
6,379,072 B1 * 4/2002 Brown et al. ................. 403/31

* cited by examiner

*Primary Examiner*—Anthony Knight
*Assistant Examiner*—Michael J. Kyle
(74) *Attorney, Agent, or Firm*—Olson and Olson

(57) ABSTRACT

A tool mount assembly is provided for attachment to the end of an extension pole for pivotal movement of the body of the tool mount assembly on an axis that is substantially perpendicular to the axial line of extension of the extension pole, the body further arranged to secure the end of a tool handle in desired positions of rotational adjustment, whereby a tool supported on the end of an extension pole may be secured in virtually an infinite variety of angular positions for ease of use of the tool at an extended reach on the end of the extension pole.

7 Claims, 3 Drawing Sheets

ADJUSTABLE TOOL MOUNT APPARATUS AND SPECIALIZED TOOL HANDLE THEREOF

This application claims benefit under 35 U.S.C. 119 (e) of the priority filing of earlier U.S. Provisional application Ser. No. 60/179,571, filed Feb. 1, 2000.

BACKGROUND OF THE INVENTION

This invention relates to tool mount devices arranged to mount tools such as paint rollers and the like onto extension poles for adjustment of the tool thereon for use. As is known, it is often advantageous to mount certain types of tools on the end of an extension pole in order to more conveniently enable use of the tool without need of also using ladders, scaffolding, etc. in order to position the operator adjacent the work area. Perhaps the most widely recognized uses of tool-mounting extension pole members is in connection with the use of paint rollers, paint brushes, window washing squeegees, etc.

Typically, these type of tools include a handle member having a threaded bore extending thereinto from its rear terminal end for threaded attachment onto the end of an extension pole member, as is well known. This threaded bore is generally provided of a certain, industry-accepted size and thread pattern so that tools of various different types and by different manufacturers may be substantially universally served by various different extension pole types and manufacture. As will be appreciated by those skilled in the art, once screwed onto the end of an extension pole, the tool is susceptible to undesirable and inadvertent loosening and unscrewing during use and, when tightly installed on a pole, is substantially fixed in position thereon, frequently making use of the tool awkward and difficult, as is also well understood by those skilled in the art.

SUMMARY OF THE INVENTION

In its basic concept this invention provides a tool mounting apparatus for extension poles and the like which is arranged to afford a quick-connect coupling therebetween that positively and securely mounts tools onto extension pole members for rotational adjustment thereon and also provides for pivotal adjustment of the tool about an axis that is perpendicular to the axial line of extension of the extension pole member whereby compound angular adjustment of the tool on an extension pole member may be accomplished as well.

It is by virtue of the foregoing basic concept that the principal object of this invention is achieved; namely, the provision of an adjustable tool mount apparatus and tool handle therefor that overcomes the disadvantages and limitations of prior art quick-release and adjustment mounts provided heretofore.

Another object and advantage of this invention is the provision of a tool mount apparatus of the class described which provides for compound angular adjustment of a pole-mounted tool relative to a work surface.

Another object and advantage of this invention is the provision of an adjustable tool mount apparatus of the class described which may utilize an adapter member to adapt conventional tool handles for full operative connection to and used with the tool mount apparatus of this invention.

A still further object and advantage of this invention is the provision of an adjustable tool mount apparatus and specialized tool handle therefor which is of simplified construction for economical manufacture.

The foregoing and other objects and advantages of this invention will appear from the following detailed description, taken in connection with the accompanying drawings of a preferred embodiment.

DESCRIPTION OF THE PREFFERED EMBODIMENTS

Figures 1, 8:
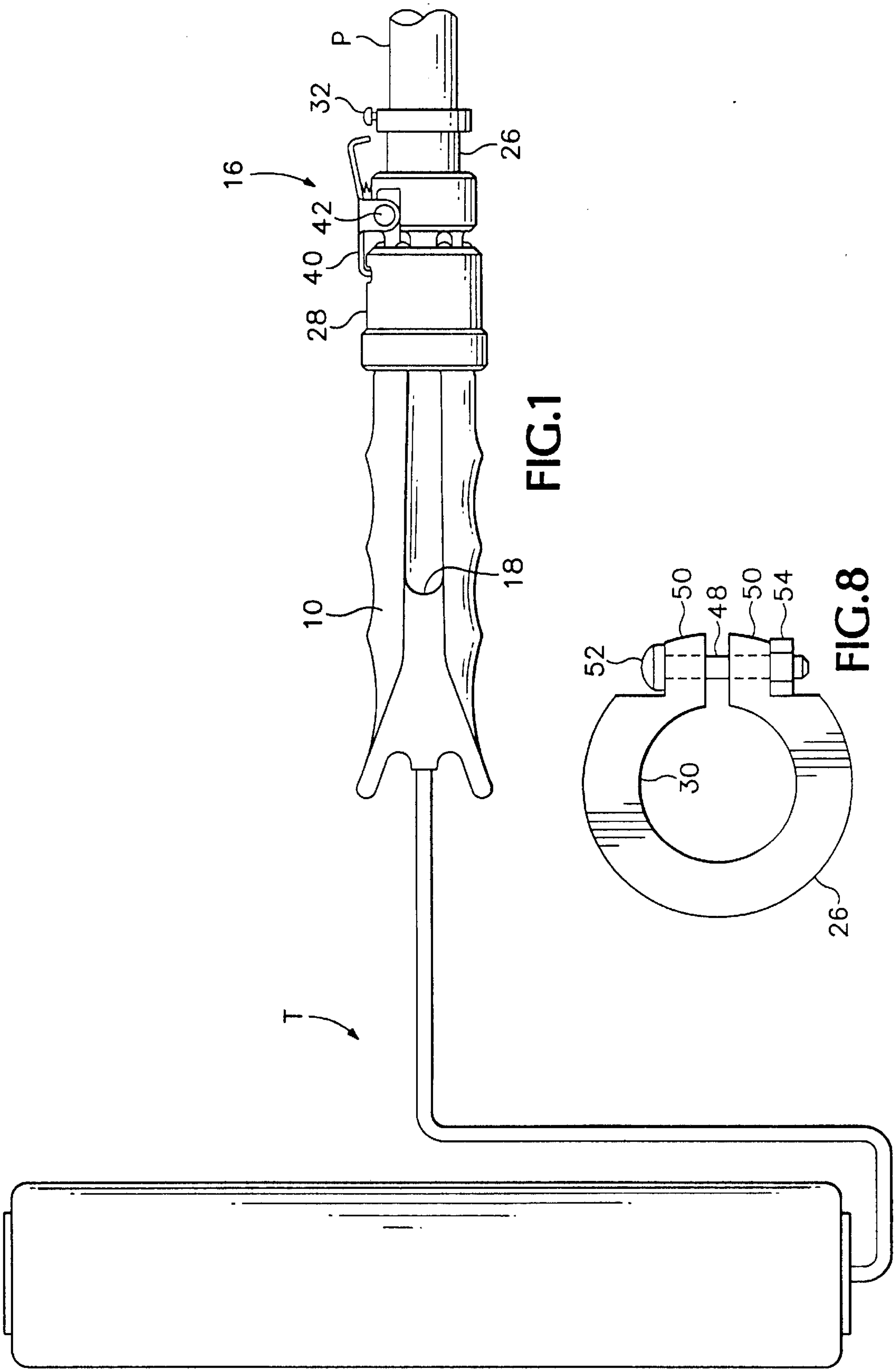
FIG. 1 is a fragmentary plan view of an extension pole mounting a paint roller to a basic form of the tool mounting apparatus of this invention.
FIG. 8 is an end view of an alternative embodiment of the end portion of the body member of FIG. 5 adapted for frictional clamping engagement with the threaded end of an extension pole to prevent unintended unthreading movement of the body member thereon.
Figure 2:
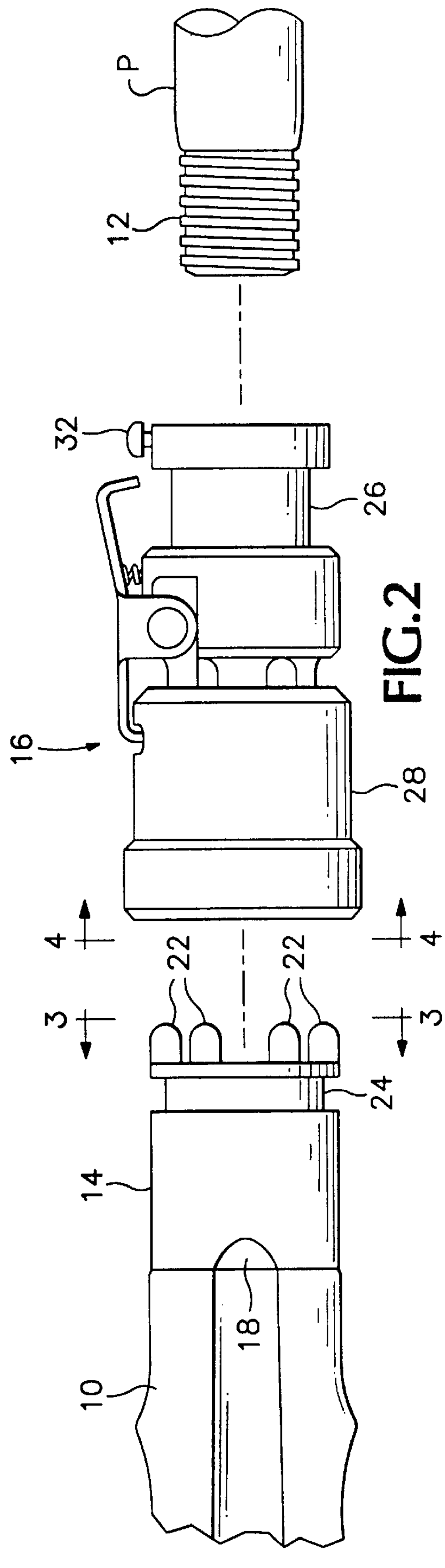
FIG. 2 is a fragmentary plan view on an enlarged scale of the roller handle, mounting apparatus an extension pole of FIG. 1 in a separated condition.
Figure 4:
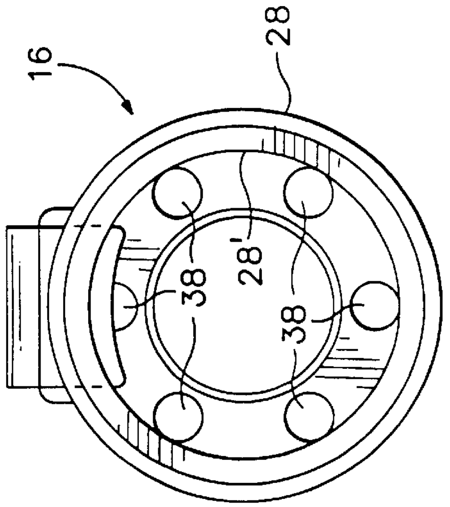
FIG. 4 is an end view of the tool handle-receiving end of the body member of the mounting apparatus of this invention taken along the line 4—4 in FIG. 2.
Figure 5:
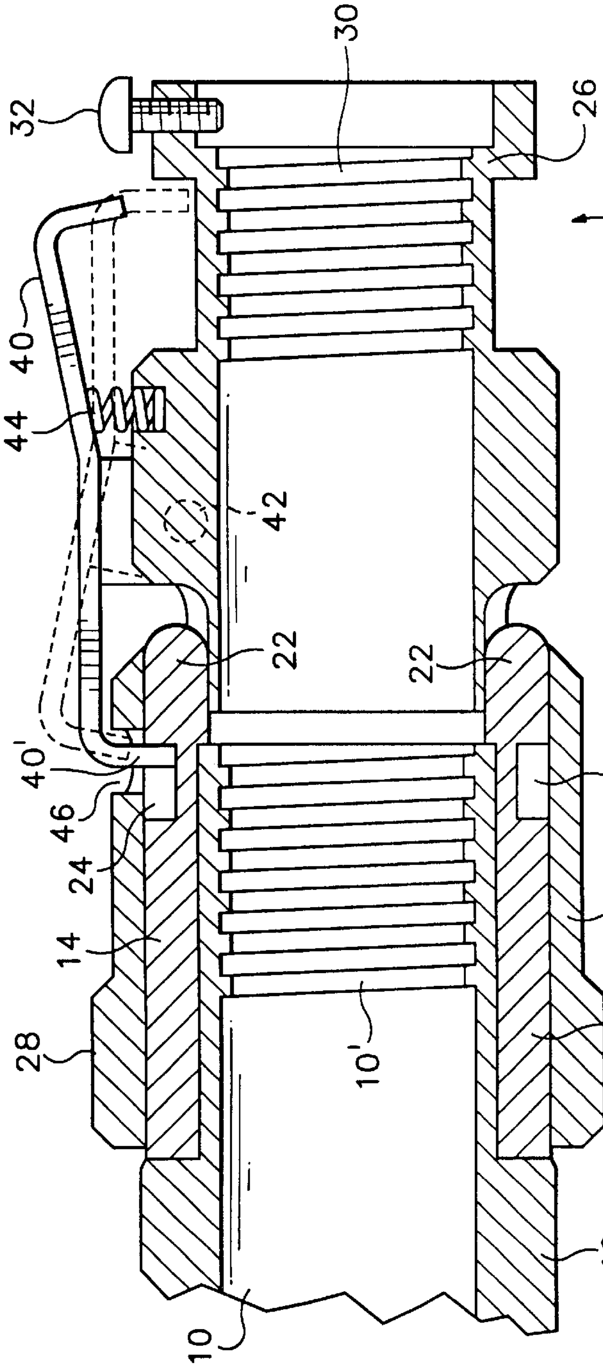
FIG. 5 is a sectional view of the tool mounting body member of this invention engaging the tool handle of this invention to show internal detail of parts hidden from view in FIGS. 1 and 2.
Figure 7:
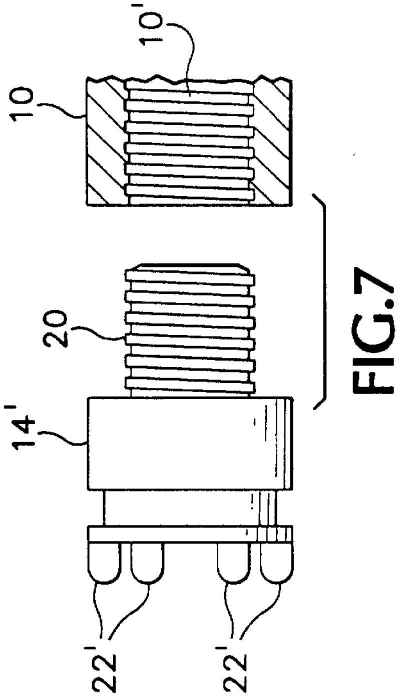
FIG. 7 is a fragmentary view of a handle adapter member arranged to adapt standard tools for use with the mounting apparatus of this invention.

As will be recognized, FIGS. 1, 2 and 5 illustrate a basic form of the invention, FIG. 1 showing a paint roller tool T operatively supported on the end of an extension pole member P through the mounting apparatus of the present invention. FIG. 2 is an exploded view of the various elements shown in FIG. 1. As will be understood from the drawings, the tool includes a handle member 10 typically configured for grasping in the hand when the tool is being operated independently from an extension pole member. The extension pole member terminates in a threaded end portion 12 configured for threaded reception within the hollow, threaded confines 10' of a conventional tool handle. Intermediate the terminal end of the tool handle 10 and threaded end 12 of the extension pole member in FIG. 2 is the basic subject matter of the present invention in the form of a tool handle end member 14 and a coupler body member 16. End member 14 may, as illustrated, be formed as a separate, unitary member configured for mounting on the end of a tool handle 10 by any suitable, conventional means such as bonding, friction press fit, or as by crimping engagement 18 shown. If desired, the end member 14 may alternatively be formed as an integral part of the manufacturing configuration of the handle member 10 itself, or, as indicated in FIG. 7, a tool handle end fitting 14' may alternatively be configured as a separate, adapter member having a projecting threaded shaft 20 arranged for threaded reception in the conventional threaded bore 10' of a conventional tool handle 10. This permits a purchaser's own tools to be adapted for use with the coupler body member of this invention.

Figure 3:
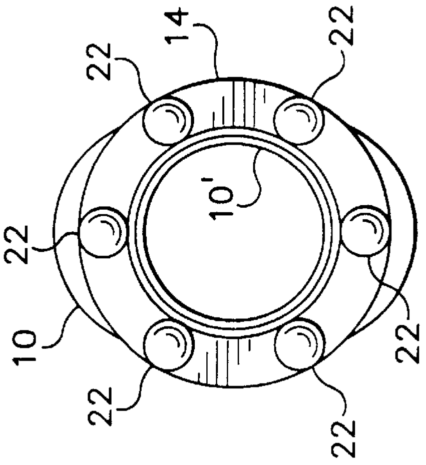
FIG. 3 is an end view of the tool handle member of this invention taken along the line 3—3 in FIG. 2.

As seen best in FIGS. 2 and 3 of the drawings, the end member 14 is configured with a plurality, (six in this embodiment), of rearwardly projecting studs 22 spaced apart equally in a circumferential pattern about the terminal end of the end member 14. An annular latch groove 24 is provided in the end member inwardly of and adjacent to the rear terminal end for reasons which will become clear later.

Figure 6:
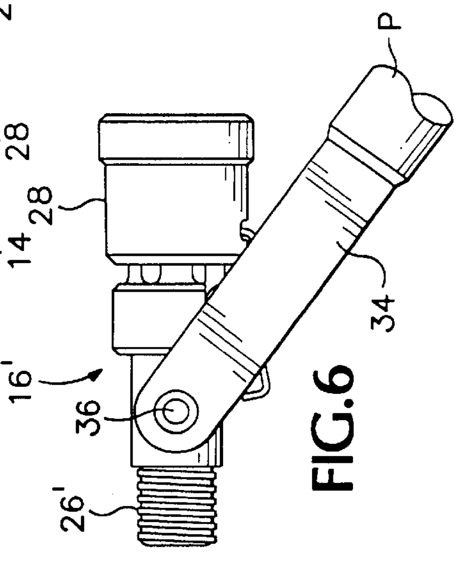
FIG. 6 is a fragmentary side elevation of another embodiment of the basic mounting apparatus of FIGS. 1, 2 and 5 wherein the body member is pivotally mounted through a bracket member mounted on an extension pole for rotational adjustment of the body member relative to the axial line of extension of the extension pole.

The body member 16 (16' FIG. 6) comprises a longitudinally elongated unit having a first end portion 26 (26' in FIG. 6), and an opposite, second end portion 28. In both the basic and preferred embodiments of the body member, the body member also includes means for attaching the body member to the end of an elongated extension pole member P. In the embodiment of FIGS. 1, 2 and 5, the first end portion 26 is configured with a hollow, internally threaded bore 30 arranged for mating, threaded reception of the threaded terminal end 12 of a standard extension pole member, as seen best in FIGS. 1 and 2 of the drawings. A friction set screw 32 is preferably provided in typical manner for selectively engaging the extension pole member frictionally to prevent unintentional unthreading and loosening of the body member once installed on the extension pole member. As an alternative to the aforementioned set screw 32 securement of the body member against unintentional unthreading on the pole, the body member end portion 26 may be provided, as shown in FIG. 8, with a longitudinally extending open slot 48 through the threaded wall of the end portion 26. Opposed clamping flanges 50 with an interengaging clamp screw 52 and nut 54 are provided as shown to releasably reduce the diameter of the threaded opening as the clamp screw is tightened. As will be understood by those skilled in the art, with the clamp screw loosened, an extension pole member may be screwed into the threaded bore 30 of the end portion 26. Upon tightening of the clamp screw 52, the pole is frictionally yet releasably retained against unthreading.

In the preferred embodiment of the body member of this invention (FIG. 6) the means for attaching the body member to an extension pole member is configured to also provide for a pivotal connection therebetween. In this regard, a bracket member 34 is configured for mounting on an extension pole member P and the body member 16' is secured to the bracket member 34 by a pivot mount intermediate the first and second end portions 26', 28, as by friction pivot screw 36 illustrated. As will be understood, mounted thusly, the body member may be rotated about the axis of the pivot screw 36, which axis extends substantially perpendicularly to the axial line of extension of the extension pole member. Preferably the friction pivot screw 36 is configured for hand tightening and loosening so that the body member may be quickly and conveniently secured in desired positions of angular adjustment without need of tools.

Since the aforementioned first end portion 26' in this preferred embodiment of the body member is not being utilized for connection to the extension pole member, as had been described in connection with the body member 16 of FIGS. 1, 2 and 5, the first end portion in this case is preferably configured as a projecting, threaded shaft 26' arranged to threadably engage the threaded interior bore of conventional tool handles in the well-known conventional manner.

The longitudinally opposite, second end portion 28 of the body members 16, 16' is configured, as best seen in FIGS. 1, 2, 4 and 5, to provide a hollow interior cavity 28' arranged to slidably receive, contain and support the tool handle end member 14 inserted thereinto. At the inner end of the cavity, equally spaced apart bores 38 are provided in a circular pattern matching the projecting studs 22 on the tool handle end member 14 for aligned reception of the studs 22 in the bores 38 when the end portion is inserted into the second end portion 28 of the body member and seated fully therein. As will be readily apparent to those skilled in the art, this cooperating interengagement permits a tool handle to be installed onto the body member in a multiplicity of positions of rotation relative to the fixed body member and associated extension pole member. This ability for rotational adjustment of the tool is particularly important in the preferred embodiment where the body member is positionable angularly relative to the extension pole member. This structure permits compound angles to be accommodated for proper positioning of a tool relative to the work surface.

Securing means on the body member is provided for releasably securing the tool handle end member 14 in engagement within the body member. In the embodiments illustrated, a finger latch member 40 is mounted on the body member by pivot mount 42 and preferably spring biased by tension spring 44 toward a normally-engaging condition, as will be understood. The latch member 40 includes a downwardly-projecting tang 40' configured to extend through an opening 46 in the second end portion 28 for engagement of the tang in the annular groove 24 on the tool handle end member 14 when the latter is installed on the body member fully in operative condition and thereby releasably retaining the end member 14 against inadvertent separation from the body member. As shown in broken lines in FIG. 5, depressing the opposite end of the latch member 40 causes the latch member to pivot on its mount, moving the tang 40' out of intercepting condition with the groove 24, permitting the tool to be pulled axially from the body member and removed.

From the foregoing it will be apparent to those skilled in the art that the present invention provides a tool mounting apparatus for extension pole members that not only provides a quick connect/disconnect coupling for tools and other implements, but one which also provides for positional and orientational adjustment of a tool in both a rotational direction as well a pivotal, an arcuate direction, on the end of the pole member so as to permit virtually any desired positioning of the tool as may be needed to provide optimal performance on the end of the extension pole member. Further, it will be apparent that the present invention provides a unique tool mounting arrangement for extension pole members and the like which is arranged to be usable with not only the specialized tool handle end configuration of the present invention, but also, as discussed and shown in FIG. 7, accommodates any conventional tool handle a user of the invention may already have.

From the foregoing it will also be apparent to those skilled in the art that various changes other than those already shown and described may be made in the size, shape, type, number and arrangement of parts without departing from the spirit of this invention.

Having thus described my invention and the manner in which it may be used, I claim:

1. A quick connect tool mount apparatus for adjustably and releasably securing the rear end of a handgrip handle of painting and other hand tools having the tool-mounting hand grip handle configured for supporting a hand tool for intended, primary operation held in a single hand of a user onto a threaded tool mount shaft of an extension pole member for orienting the hand tool for use of the normally hand-held hand tool thereon at extended reach from a user, said quick connect tool mount apparatus comprising:

a) a tool handle end member associated with the rear terminal end of a hand tool handle, said end member having a substantially cylindrical external body portion configured with a predetermined, substantially cylindrical external surface diameter and a plurality of equally circumferentially spaced-apart studs on and projecting axially rearwardly from the rear terminal end of the end member body, b) an elongated, end member-receiving coupler body member configured for mounting onto the threaded tool mount shaft of an extension pole member, said coupler body member having opposite longitudinal end portions, one said longitudinal end portion providing a substantially hollow cavity having an internal diameter configured for axial sliding reception of said cylindrical body portion of the tool handle end member inserted thereinto, the cavity terminating in an inner, rear end wall having a plurality of equally circumferentially spaced-apart bores therein arranged to matingly correspond with and receive said studs projecting axially from said rear terminal end of said cylindrical body portion of the tool handle end member fully inserted into the cavity of said one end of the coupler body member to prevent relative rotation of the fully inserted end member and coupler body member, and c) lock means for releasably engaging the cylindrical body portion of the tool handle end member fully inserted into said hollow cavity and releasably securing the end member therein with said axially projecting studs matingly received in said corresponding bores in the rear end wall of the cavity of the coupler body member and with the tool handle projecting axially from the coupler body member, whereby d) with the coupler body member mounted on the threaded tool mount shaft of an extension pole member, the tool handle end member on the terminal end of the tool handle may be inserted partially into the cavity of the coupler body member and the tool handle rotated to orient the hand tool as desired for use on the extension pole member and to bring the plurality of corresponding studs and bores into axial alignment for mating reception therebetween as the tool handle end member is inserted fully into said cavity whereupon the locking means engages the cylindrical body portion of the end member to releasably secure the hand tool handle in desired orientation connected to the coupler body member supported on the threaded tool mount shaft of the extension pole member.

2. The tool mount apparatus of claim 1 wherein the other, opposite longitudinal end portion of said coupler body member is configured as a threaded socket member configured for threaded attachment onto the threaded tool mount shaft of an extension pole member.

3. The tool mount apparatus of claim 2 including clamp means on said threaded socket end portion of the coupler body member for releasably clamping the threaded socket of the coupler body member into increased frictional threaded engagement with the threaded shaft of an extension pole member to prevent unintentional unthreading movement between the coupler body member and the threaded shaft of the extension pole member.

4. The tool mount apparatus of claim 1 wherein said tool handle end member is configured as a fixed, integrated element of the hand tool handle construction forming the rear terminal end portion of a hand tool handle.

5. The tool mount assembly of claim 1 wherein said tool handle end member is configured as an adapter body member having a forwardly projecting threaded shaft configured for threaded mounting engagement onto the rear terminal end of the hand tool handle having a threaded internal bore extending axially inwardly from its rear terminal end.

6. The tool mount assembly of claim 1 including a mounting bracket configured at one end for attachment to the threaded tool mount shaft of an extension pole member and configured at the opposite end of the mounting bracket for pivotal attachment to the coupler body member intermediate said opposite longitudinal end portions of the coupler body member for rotation of the coupler body member on said pivotal attachment about an axis extending substantially perpendicular to the axial line of extension of an extension pole attached to the mounting bracket, and releasable securing means interengages the coupler body member and mounting bracket for releasably securing the coupler body member in selected positions of rotational adjustment on the mounting bracket and thereby in selected positions of angular adjustment relative to the axial line of extension of an extension pole member attached to the mounting bracket.

7. The tool mount assembly of claim 6 wherein the other, opposite longitudinal end portion of the coupler body member is configured as an axially projecting, threaded shaft configured for threaded connection to a hand tool handle having a threaded internal bore extending axially inwardly from its rear terminal end.

* * * * *